UNITED STATES PATENT OFFICE.

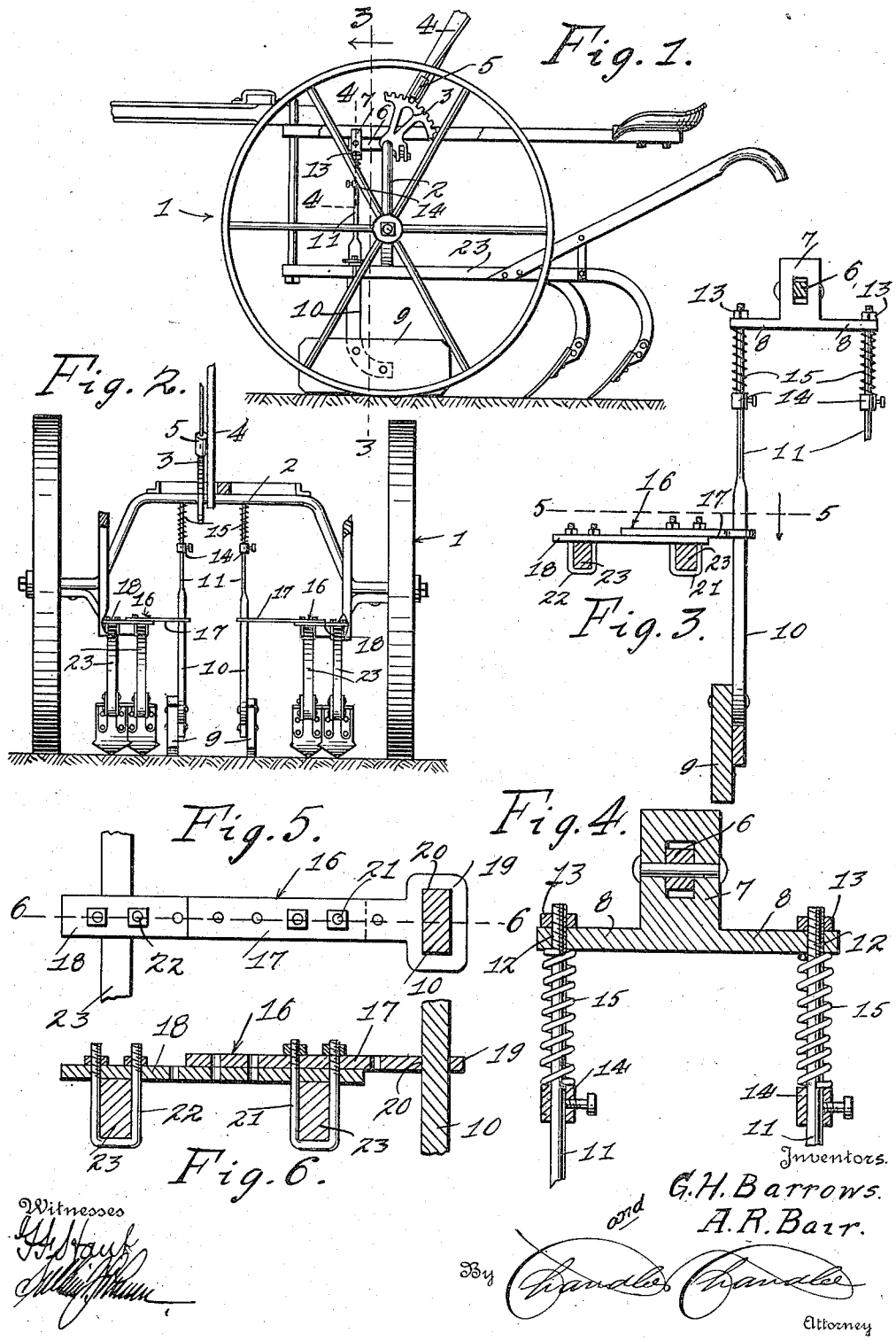

GEORGE H. BARROWS AND ARTHUR R. BAIR, OF STICKNEY, SOUTH DAKOTA.

CULTIVATOR-SHIELD.

1,177,089.  Specification of Letters Patent.  Patented Mar. 28, 1916.

Application filed June 21, 1915. Serial No. 35,397.

*To all whom it may concern:*

Be it known that we, GEORGE H. BARROWS and ARTHUR R. BAIR, citizens of the United States, residing at Stickney, in the county of Aurora, State of South Dakota, have invented certain new and useful Improvements in Cultivator-Shields; and we do hereby declare the following to be a full, clear, and exact description of the invention, such as will enable others skilled in the art to which it appertains to make and use the same.

The present invention is directed to cultivator shields, and has for its object to so construct a device of this character that the same can be easily and quickly applied to a conventional form of cultivator.

A further object of the invention is to provide means for simultaneously moving a pair of shields toward or from the ground, said means being within convenient and easy reach of the operator.

A still further object of the invention is to so mount the shields as to eliminate the danger of breakage when the same come in contact with stones or the like.

With the above and other objects and advantages in view, the invention resides more particularly in the novel combination, formation and arrangement of parts as more fully described hereinafter and pointed out in the appended claim.

Reference is had to the accompanying drawings, wherein similar characters of reference designate corresponding parts throughout the several views, and in which:

Figure 1 is a side elevation of a cultivator equipped with the shields. Fig. 2 is a rear elevation of the same. Fig. 3 is a sectional view on the line 3—3 of Fig. 1. Fig. 4 is a sectional view on the line 4—4 of Fig. 1. Fig. 5 is a similar view on line 5—5 of Fig. 3. Fig. 6 is a similar view on line 6—6 of Fig. 5.

Referring to the drawing 1 designates a cultivator, having the usual arched axle 2 which has clamped thereto the rack segment 3. Pivotally associated with the segment 3 is a hand lever 4, which is provided with the usual pawl 5. The lower end of the lever 4 terminates in an angular extension 6 which is pivotally engaged in the head 7, said head being provided with horizontal arms 8, the purpose of which will appear later.

A pair of sheet-metal shields 9 are provided and have fixed thereto sheet-metal bars 10, which are vertically disposed and have fixed to the upper ends rods 11. The upper ends of the rods 11 are slidably engaged in perforations 12 formed adjacent the outer ends of the arms 8. The upper ends of the rods 11 have threaded thereon nuts 13. Adjustably mounted on each rod 11 is a collar 14, and interposed between the arms 8 and collars 14 are coil springs 15, which encircle the rods.

Drag bars 16 are provided for each shield, and consist of links 17 and 18, the link 17 being provided with a head 19 having formed therein a slot 20 which is adapted to receive the bar 10 of each shield. The links 17 and 18 are each provided with a plurality of alined perforations, which when in registry are adapted to be engaged by a U-bolt 21, whereby said links may be adjusted longitudinally, and connected to the inner beam 23. Similarly constructed bolts 22 are carried by the outer ends of the links 18, said bolts being adapted to engage the outer beam 23.

By providing the springs 15 it is obvious that should the shields contact with a stone or the like that said springs will yield sufficiently to prevent breakage of the shields.

When it is desired to raise or lower the shield the hand lever 4 may be manipulated as desired, and since the bars 10 slide within the slots 20 formed in the links 17 this operation is readily accomplished.

It will be noted that the bolts 22 not only serve to attach the drag bars to the inner beams of the cultivator, but also serve to hold the links 17 and 18 in adjusted positions.

What is claimed is:—

The combination with a cultivator having shovel supporting beams, a hand lever supported by a part of the cultivator, a head pivotally connected to the hand lever and having arms, a pair of shields having supporting bars provided with rods for slidably and yieldably engaging said arms, drag bars consisting of adjustably connected links, one of said links being slidably connected to a supporting bar and the other link being rigidly connected to an adjacent shovel supporting beam, as and for the purpose set forth.

In testimony whereof, we affix our signatures in the presence of two witnesses.

GEORGE H. BARROWS.
A. R. BAIR.

Witnesses:
W. P. SMITH,
R. H. GOODERD.

Copies of this patent may be obtained for five cents each, by addressing the "Commissioner of Patents, Washington, D. C."